United States Patent Office 2,765,325
Patented Oct. 2, 1956

2,765,325

SURFACE ACTIVE POLYAMIDES

Warren D. Niederhauser, Huntingdon Valley, Pa., assignor to Rohm & Haas Company, Philadelphia, Pa., a corporation of Delaware No Drawing. Application May 26, 1953,
Serial No. 357,641

14 Claims. (Cl. 260—404.5)

This invention relates to polyamides having a hydrophobic group and recurring N-alkylene formamide groups. These compounds may be represented by the general structure

wherein R is a hydrocarbon group of at least seven carbon atoms, A is an alkylene group of two to three carbon atoms with two carbon atoms between nitrogens, and $x$ is an integer of at least three, being usually 3 to 10. This invention also relates to a process for preparing these compounds.

These compounds are surface active agents useful in the fields of wetting, dispersing, emulsifying, cleaning, foaming, and the like. Since they provide exceptionally high foaming action, they are useful in detergent compositions which require this action. For example, they may be compounded with alkylaryl sulfonates or alcohol sulfates to give compositions of excellent detersive action. They are also useful as textile finishing agents and antistatic agents.

The polyamides of this invention are prepared by forming a polyaminoamide by reacting a monocarboxylic acid having a hydrophobic residue with a polyalkylenepolyamine to form a polyaminopolyalkylene carboxylic amide, and reacting this amide with a lower alkyl formate. In place of an alkyl formate there may less desirably be used formic acid.

The reaction of monocarboxylic acid and polyalkylenepolyamine is effected by mixing acid and polyamine in about equimolecular proportions and heating the mixture between about 125° and 200° C. until about one molecular proportion of water has been evolved. The preferred range of temperature is from 125° to about 175° C., since in this range cycle formation is essentially avoided.

The polyalkylenepolyaminoamide thus produced is mixed with a lower alkyl formate or its equivalent. At least three moles of formate are needed per mole of acid or amide to bring about water-solubility of the final product. As many moles of formate may be used as there are —NH— groups in the amide. In any case sufficient of the amino groups should be reacted to ensure water-solubility.

The reaction between amide and formate starts usually even in the cold with the temperature of the mixture rising from the heat of reaction. While the reaction can in most cases be completed between 20° and about 100° C., there are some cases in which higher temperatures may be used, as up to about 125° C.

The first stage of the process as described above is desirably carried out in the presence of an inert organic solvent, such as xylene or naphtha. When such system is heated under reflux, water is readily removed azeotropically. Solvent may then be removed conveniently under reduced pressure. Organic solvent is not necessary during the second stage of the process, but may be used if desired.

As starting acids there may be used long chained fatty acids, such as caprylic, capric, undecanoic, lauric, myristic, palmitic, margaric, stearic, arachidic, carnaubic, undecylenic, oleic, erucic, linoleic, or ricinoleic; alkylaryl, such as butylbenzoic, octylbenzoic, or butylnaphthoic; arylaliphatic, such as butylphenylacetic or octylphenoxyacetic; cycloaliphatic, such as octylhexahydrobenzoic, abietic, or various naphthenic acids. Instead of an individual acid there may be used a mixture of acids, such as occur in natural fats and oils, as in coconut oil, animal fat, palm oil, castor oil, linseed oil, etc., or in cuts of naphthenic acids, or acids derived from petroleum cuts through oxidation, or tall oil acids.

The monocarboxylic acids may be summarized by the formula RCOOH, where R is a hydrocarbon group of at least seven carbon atoms. R should be of sufficient size to supply the hydrophobic balance required for the polyamide groups present in the final product. In general R will have from 7 to 23 carbon atoms.

Instead of the free acids there may be used anhydrides, acyl halides, esters of lower alkanols, carboxylic amides, or ammonium carboxylates.

As polyamines there may be used any of the polyethylenepolyamines having at least three ethylene groups. There is no fixed value for the upper limit of the number of these groups, although because of lack of availability of larger compounds, the practical limit is at about ten. Mixtures of polyethylenepolyamines are quite as desirable as individual polyamines. In place of polyethylenic compounds there may be used 1,2-propylene homologues or polyamines having mixed alkylene groups.

These polyamines may be summarized by the formula $NH_2(ANH)_xH$, where A is an ankylene group of two to three carbon atoms with two carbon atoms between nitrogens and $x$ has a value of three to ten.

For introduction of the formyl group into the polyamino amide there is most conveniently used an alkyl formate. When the alkyl group thereof is derived from a lower alkanol, such as methyl, ethyl, propyl, or butyl alcohol, the alcohol formed in the reaction can be readily distilled from the reaction mixture. The proportion of an alkyl formate reacted should be sufficient to ensure solubility of the final product in water. This requires from about three moles of formate up to a number of moles equal to the number of amino groups in the polyaminoamide with which the formate is reacted.

While the primary product formed may be represented by the formula $RCONH[AN(CHO)]_xH$, it is probable that some of the product may exist in a glyoxalidine form, thus

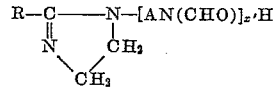

Also, in large molecular polyalkylenepolyamines there appear to be present some complex molecules, since there is evidence of small amounts of tertiary nitrogen therein.

In the following illustrative examples typical procedures are shown with additional details. Parts are by weight.

*Example 1*

There were mixed 472 parts of tetraethylenepentamine, 500 parts of lauric acid, and 250 parts of xylene. The mixture was heated at reflux temperatures with trapping of the condensate and removal of water. Heating was continued at 145°–166° C. for nine hours. The temperature was lowered to 95° C. and the solvent was removed under reduced pressure. There was thus obtained a residue of 800 parts of an oily fluid which was insoluble in water and which was chiefly the compound

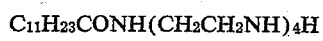

(a) A portion of 88.2 parts of the above prepared compound was placed in a reaction vessel equipped with a water-cooled reflux condenser and stirrer. While this material was stirred, ethyl formate was added to a total of 55.5 parts. Heat of reaction carried the temperature from 25° to 73° C. Heat was then applied and the reaction mixture was held at 84°–94° C. for two hours. The reaction mixture was subjected to reduced pressure to remove the alcohol formed. There was obtained as product a viscous oil which was soluble in water. Its aqueous solutions foamed and gave stable emulsions of benzene, toluene, zylene, and methylated naphthalenes. This product contained formamide groups and a residual amino group.

(b) Another portion of 88.2 parts of the above prepared polyaminoamide was treated in the same way with 74 parts of ethyl formate. The reaction mixture was heated at 75°–78° C. for four hours. Alcohol was then taken off under reduced pressure, leaving 106 parts of a viscous oil as product which contained formamide groups. It was soluble in water. Its solution had very low tensions. This product was fungicidal and bactericidal. Against *Salmonella typhosa* it showed a phenol coefficient of 28 and against *Micrococcus pyogenes* it had a phenol coefficient of 20.

The formula of this compound may be represented $$C_{11}H_{23}CONH[CH_2CH_2N(CHO)]_4H$$

(c) The procedure of (b) was repeated with substitution of 60 parts of methyl formate for previously used ethyl formate. After the initial reaction under reflux appeared over, the mixture was heated at about 75° C. for four hours and the reaction mixture was stripped under reduced pressure. The resulting product was identical with that made above.

(d) The above formates were replaced with 102 parts of butyl formate and the procedure was carried out in the same way. Butyl alcohol was distilled off under reduced pressure. The product was like that obtained above.

These products are effective corrosion inhibitors. They are also useful finishing agents for textiles.

*Example 2*

There were mixed 705 parts of oleic acid, 472 parts of tetraethylenepentamine, and 200 parts of zylene. The mixture was heated under reflux with removal of water with the aid of a trap. Heating was continued at 150°–179° C. for six hours. The temperature was then lowered to 95° C. and xylene was removed under reduced pressure. There resulted 1086 parts of an oil which was polyethylenepolyamino oleylamide.

(a) A portion of 108.7 parts of this amide was placed in a reaction vessel annd 29.6 parts of ethyl formate were slowly added thereto. The reaction mixture was heated for two hours at temperatures of 94°–109° C. To the reaction mixture 44.4 parts of ethyl formate were then slowly added and this reaction mixture was heated at 68°–72° C. for three hours. Ethanol was distilled off under reduced pressure to give 123 parts of a viscous oil. This material dissolved in water to give hazy solutions which were quite surface active.

(b) There were mixed 108.7 parts of the above amide and 65 parts of methyl formate. The mixture was heated under reflux for five hours. The pressure thereon was then reduced and volatile material was distilled off, leaving a viscous oil which was not distinguishable from the product obtained above.

The products thus prepared corresponded in composition to $$C_{17}H_{33}CONH[C_2H_4N(CHO)]_4H$$

They are useful as finishing agents for textiles and as antistatic agents.

*Example 3*

There were mixed 123 parts of nonaethylenedecamine, 55.2 parts of lauric acid, and 40 parts of xylene. The mixture was heated under reflux with removal of water. The temperature was kept at 145°–148° C. for 4.5 hours. The temperature was then reduced to 95° C. and xylene was taken off under reduced pressure. The product obtained as a residue was the lauric amide of the above polyamine.

This product was mixed with 163 parts of ethyl formate. The mixture was heated at 51°–56° C. for two hours and stripped of alcohol under reduced pressure. There resulted a very viscous liquid which was soluble in water. The solutions had low surface tensions. It was useful as a wetting agent and detergent. The product corresponds in composition to the compound.

$$C_{11}H_{23}CONH[C_2H_4N(CHO)]_9H$$

*Example 4*

There were mixed 77.8 parts of oleic acid, 123 parts of nonaethylenedecamine, and 45 parts of xylene. The mixture was stirred and heated under reflux for five hours. The temperature was reduced to about 95° C. and the solvent removed under reduced pressure to give a viscous oil. This was the desired polyaminoamide.

To this product there was added ethyl formate to a total of 163 parts. This mixture was heated under reflux for two hours. Heating was continued under reduced pressure until volatile materials were removed. The residue was the poly-N-formylated product of the above amide, a viscous liquid, which was soluble in water. The solutions had low surface and interfacial tensions.

*Example 5*

There were mixed 164 parts of tall oil acids, 94 parts of tetraethylenepentamine, and 90 parts of a naphtha. The mixture was heated at 150°–170° C. with removal of water. The solvent was then stripped off under reduced pressure to give the corresponding polyaminoamides.

This product was treated with 325 parts of ethyl formate and the resulting mixture was heated under reflux for four hours. Volatile material was taken off under reduced pressure. The product was a very viscous, surface-active material, giving turbid solutions in water which gave good wetting and detergency.

*Example 6*

There were mixed 91 parts of tall oil acids, 123 parts of nonaethylenedecamine, and 50 parts of xylene. The mixture was stirred and heated under reflux for five hours. The temperature was lowered below 100° C. and solvent was taken off under reduced pressure. The residue was a mixture of polyaminoamides of the tall oil acids.

This product was treated with 163 parts of ethyl formate. The mixture was heated under reflux for three hours. Volatile materials were taken off under reduced pressure. There was thus obtained the N-formylated product, $RCONH[C_2H_4N(CHO)]_9H$, where R represents the residue of the tall oil acids. It was soluble in water. The aqueous solutions had low surface tensions. This product promoted foaming and was an emulsifier for hydrocarbon liquids.

In place of the long chained carboxylic acids used above there may be used other monocarboxylic acids having a hydrocarbon group of seven or more carbon atoms or other residue having hydrophobic properties. The amino groups of the resulting amides are reacted with an alkyl formate or equivalent material to give polyformamido groups. The resulting products are non-ionic, surface-active agents.

I claim:

1. A process for preparing polyamides which comprises reacting between 125° and about 175° C. in about molar proportions with evolution of about one molar proportion of water a monocarboxylic acid and the structure RCOOH, where R is a hydrocarbon group of 7 to 23 carbon atoms, and a polyalkylenepolyamine of the formula $$NH_2(ANH)_xH$$

wherein A is an alkylene group of two to three carbon atoms with two carbon atoms between nitrogens and $x$ is an integer from three to ten, whereby a polyaminoamide is formed, and reacting said polyaminoamide with an alkyl formate having not over four carbon atoms in the alkyl portion thereof, there being reacted three to ten molar proportions thereof per molar proportion of said acid, the number of molar proportions of said alkyl formate being the same as the numerical value of $x$.

2. A process for preparing polyamides which comprises reacting between 125° and about 175° C. in about molar proportions an aliphatic monocarboxylic acid having a hydrocarbon residue of 7 to 23 carbon atoms and a polyethylenepolyamine having three to ten ethylene groups, whereby a polyaminoamide is formed, and reacting said polyaminoamide with an alkyl formate having not over four carbon atoms in the alkyl portion thereof, there being reacted at least three moles of said formate per molar proportion of said acid up to about a number equal to the number of amino groups in said polyaminoamide, the number of moles of said formate being the same as the number of said ethylene groups.

3. The process of claim 2 in which the polyethylenepolyamine is tetraethylenepentamine.

4. The process of claim 2 in which the polyethylenepolyamine is nonaethylenedecamine.

5. A process for preparing polyamides which comprises reacting between 125° and about 175° C. in about molar proportions with evolution of about one molar proportion of water lauric acid and a polyethylenepolyamine having three to ten ethylene groups, whereby a polyaminoamide is formed, and reacting said polyamino amide with an alkyl formate, the alkyl group thereof having not over four carbon atoms, there being reacted between three moles of said formate per mol of said acid up to a number equal to the number of amino groups in said polyaminoamide, the number of said moles of said formate being the same as the number of said ethylene groups.

6. A process for preparing polyamides which comprises reacting between 125° and about 175° C. in about molar proportions with evolution of about one molar proportion of water oleic acid and a polyethylenepolyamine having three to ten ethylene groups, whereby a polyaminoamide is formed, and reacting said polyaminoamide with an alkyl formate, the alkyl group thereof having not over four carbon atoms, there being reacted between three moles of said formate per mole of said acid up to a number equal to the number of amino groups in said polyaminoamide, the number of moles of said formate being the same as the number of said ethylene groups.

7. A process for preparing polyamides which comprises reacting between 125° and about 175° C. in about molar proportions with evolution of about one molar proportion of water tall oil acids and a polyethylenepolyamine having three to ten ethylene groups, whereby a polyaminoamide is formed, and reacting said polyaminoamide with an alkyl formate, the alkyl group thereof having not over four carbon atoms, there being reacted between three moles of said formate per mole of said acid up to a number equal to the number of amino groups in said polyaminoamide, the number of moles of said formate being the same as the number of said ethylene groups.

8. Polyamides of the general structure $$RCONH[AN(CHO)]_xH$$

wherein R is a hydrocarbon group of 7 to 23 carbon atoms, A is an alkylene group of two to three carbon atoms having two carbon atoms between nitrogens, and $x$ is an integer from three to ten.

9. Polyamides of the general structure $$RCONH[AN(CHO)]_xH$$

wherein R is an aliphatic hydrocarbon group of 7 to 23 carbon atoms, A is an alkylene group of two to three carbon atoms having two carbon atoms between nitrogens, and $x$ is an integer from three to ten.

10. A compound of the formula of claim 9 where R is the residue of lauric acid.

11. A compound of the formula of claim 9 where R is the residue of oleic acid.

12. A polyamide of the general structure $$RCONH[CH_2CH_2N(CHO)]_xH$$

wherein R is an aliphatic hydrocarbon group of 7 to 23 carbon atoms and $x$ is an integer from three to ten.

13. A polyamide of the general structure $$RCONH[CH_2CH_2N(CHO)]_4H$$

wherein R is an aliphatic hydrocarbon group of 7 to 23 carbon atoms.

14. A polyamide of the general structure $$RCONH[CH_2CH_2N(CHO)]_9H$$

wherein R is an aliphatic hydrocarbon group of 7 to 23 carbon atoms.

References Cited in the file of this patent

UNITED STATES PATENTS

| | | |
|---|---|---|
| 1,947,951 | Neelmeier et al. | Feb. 20, 1934 |
| 2,453,057 | Zienty | Nov. 2, 1948 |